3,115,462
METHOD OF INHIBITING IRRADIATION-INDUCED VISCOSITY INCREASE OF ORGANIC FLUIDS
George H. Denison and Robert O. Bolt, San Rafael, James W. Kent, El Cerrito, and Frederick A. Christiansen, Manhattan Beach, Calif., assignors, by mesne assignments, to the United States of America as represented by the United States Atomic Energy Commission
No Drawing. Filed Sept. 15, 1953, Ser. No. 380,378
6 Claims. (Cl. 252—46.6)

The present invention relates in general to inhibition of irradiation damage to organic liquids, and particularly to an improved method for inhibiting neutron-reactor-irradiation-induced viscosity increase and general deleterious thickening of organic fluids, particularly hydrocarbons, hydrocarbon esters, and poly-ethers, and especially lubricating oils predominantly comprised of the same, and to an improved method for effecting lubrication under neutronic-reactor-irradiation whereby irradiation-induced deterioration of lubricating efficacy is mitigated.

As is known, increasing interest, engineering experimentation and design, and practical application are contemporarily being accorded to the neutronic fission reactor as a radically-advanced source of thermal power. Significantly, in the neutron-induced chain fission reaction accomplished by such reactor, the specific energy content liberated thereby is enormous; the quantity and rate of thermal energy producible, per unit amount of fissionable material consumed, vastly surpass those producible by conventional chemical combustion. For example, in neutron-induced fission of the 235 isotope of uranium, the amount of thermal energy produced per pound of fuel consumed is of the order of two million times that produced by aviation gasoline. Consequently, even in brisk operation as a heat source, a reactor's fuel depletion is comparatively insignificant, such that the initial charge of fuel is ordinarily sufficient to sustain the reaction indefinitely; with such a "furnace," the need for constantly replenishing the fuel is virtually eliminated. Similarly, since the chain fission reaction is inherently capable of operation at intensities on up to those orders manifested by the stellar temperatures attained in atomic bombs, the reactor as a heat source is normally adapted to operation at virtually any desired rate of energy release and temperature level that its structure and materials of construction can withstand. Furthermore, a chain fission reacting system admits of unusual compactness; especially when gross amounts of extraneous materials are excluded from the amassment, an operating reactor core may well be smaller than a few cubic feet in volume. By virtue of these attributes, the neutronic reactor has proven exceptionally promising for use as the ultimate heat source for power plants, particularly for stationary electric generating plants, and for mobile propulsive power plants for ships and aircraft; of especial significance in mobile applications, where the afforded elimination of the need for any substantial amount of replacement fuel renders insignificant the formerly-limiting fuel capacity consideration, practical limitless range of such craft may be realized.

The fundamental theory, details of construction, and principles of operation, of neutronic reactors are now widely known in the art. For such details, specific reference is made to published papers, as for example:

"The Science and Engineering of Nuclear Power," vols. 1 and 2, edited by Clark Goodman, Addison-Wesley, 1947–1949;

"Elementary Pile Theory," Soodak and Campbell, 1950, Wiley;

"First Detailed Description of the AEC Research Reactors," Atomics, vol. 6, No. 6, November-December 1950, pages 4–22;

and copending applications of the common assignee, as:

S.N. 568,904, filed December 19, 1944, in the names of E. Fermi and L. Szilard, for Chain Reactions, now U.S. Patent 2,708,656 dated May 17, 1955;

S.N. 321,078, filed November 18, 1952, now Patent No. 2,945,794 in the names of Charles E. Winters et al., for Improved Neutronic Reactor Operational Method and Core System; and S.N. 314,595, filed October 14, 1952, now Patent No. 2,831,806, in the name of Eugene P. Wigner, for High Flux Experimental Pile.

In simplest contemplation, the essence of a neutronic reactor is an amassment of fissionable material in sufficient quantity to self-sustain a chain fission reaction therein. That is, in the fission reaction, an atomic nucleus of a fissionable material—prominent among which are the isotopes uranium-235, plutonium-239, uranium-233, and others—absorbs a neutron of indiscriminate energy and thereupon splits into a plurality of fragments of greater mass than an alpha particle, which splitting is accompanied not only by the release of a relatively enormous amount of energy, but also by the release of a plurality of fresh neutrons. By virtue of the fission reactions' generating more new neutrons than it consumes, it is possible, by amassing sufficient fissionable material under appropriate conditions, to form an aggregate system capable of generating new fission-inducing neutrons at a rate equal to or greater than that at which they are being lost to the system as a result of absorption in the system or leakage from the system, and consequently capable of maintaining a self-sustaining neutron induced chain fission reaction. As further refinements, since the propensity of fissionable isotopes for absorption of neutrons leading to fission prominently increases with decrease in kinetic energy of the neutrons, it is customary, in most circumstances, to incorporate in the amassment, in more or less intimate admixture with the fissionable material, another material effective in decelerating neutrons upon their encountering same; such material, for example, water, heavy water, graphite, beryllium, or the like, is termed a "neutron-moderant." To remove heat generated, a stream of heat-transfer fluid is generally circulated through the amassment, and to control the rate of fission reaction, a system of adjustably insertable masses of a strong neutron absorber, such as boron or cadmium, which will, when inserted, serve to fruitlessly dissipate neutrons, is normally provided. A typical reactor, for example, is constituted of a cubical core of graphite ca. 20 feet in each principal dimension, built up of stacked graphite bars, having a multiplicity of parallel horizontal channels passing completely therethrough, and having a multiplicity of masses of natural uranium metal disposed within such channels. The atomic ratio of carbon to uranium in the cube is of the order of 200, such that the average neutron energy in the system closely approaches that of the normal thermal energy of neutrons at the ambient temperature, i.e. ca. of 0.025 electron volt at room temperature. The tube has adjustably inserted therein a plurality of control rods, comprising a strong neutron absorber whereby the fission rate may be appropriately regulated by adjustment of the extent of the rods withdrawal from the cube. Air, or other coolant, is continuously blown or drawn through the aforesaid channels, which are only partially occupied by the masses of uranium, to remove the heat generated within the cube.

Characteristically, operation of a reactor is attended by the continuous emanation, in all directions therefrom, of radiation of various types—principally neutrons, gamma rays, and alpha and beta particles—of energies ranging to exceedingly great intensities and in quantities so immense as to fall in a realm wholly different from any experienced prior to the advent of the reactor. Among these, neutrons and gamma rays are, by far, of the greater consequence; while the alpha and beta radiation, being charged particles, are mostly stopped upon encountering merely a few millimeters of any intervening solid material, the neutrons and gammas are exceeding more penetrating, and thus generally bombard and permeate all unshielded surrounding environment of the reactor. Representative of the spectrum of neutron and gamma radiation ordinarily emanated from such as the typical reactor alluded to hereinabove are the data presented in Table I following.

TABLE I

*Typical Neutron and Gamma Radiation Spectrum Emanated From Operating Neutronic Reactor [1] (Approximate)*

| Neutrons | | Gamma Rays | |
|---|---|---|---|
| Total Flux=ca. $1 \times 10^{10}$ neutrons/cm.$^2$/sec., ca. 5,000 Roentgens/hr. | | | |
| Energy Range | Percentage of Neutrons | Energy Range | Percentage of Photons |
| 8 to 0.5 Mev. [2] | 10 | Ca. 8 Mev | 20 |
| 0.5 Mev. to 0.025 Mev. | 90 | Ca. 3–2 Mev | 30 |
| | | Ca. 1 Mev | 50 |

[1] For bare thermal reactor; graphite moderated; air cooled.
[2] Million electron volts.

For reactors operating at higher generated power densities, especially the more compact mobile reactors designed for aircraft and ship propulsion, the levels of total flux emanated tend to range from 1 to 3 orders of magnitude higher than those outlined in Table I, although the relative distribution of radiation throughout the spectrum is usually not greatly different; the levels of flux within the hearts of the reactor cores themselves tend to be another one or two orders of magnitude greater than those indicated to be emanated from the surface.

More particularly concerning the present invention, the derivation of useful nuclear power will often require the use, in such intensely radioactive environment of a reactor, of fluid organic compounds for functions dependent primarily upon fluidity. Such materials include especially lubricants, as well as power transmission fluids, heat transfer fluids, and the like. For example, in designs for aircraft propulsion application, where a reactor is simply substituted, in place of fuel combustion units, to serve to heat the air in an enlarged version of a conventional turbo-jet engine, the main bearings of the compressor-turbine rotor and their lubricant may be located within a foot or so of the reactor core, and in such position are exposed to the full fury of the virtually unimpeded radiations emanated from the reactor core. Likewise, in other mobile and stationary applications wherein, for extracting the generated heat from the reactor, a stream of liquid coolant, such as water, aqueous solutions, molten metals, molten salts, and the like, is flowed in heat-transfer relationship therethrough, the liquid-circulating pumps, their bearings, and their lubricants, are similarly disposed in close proximity to the reactor core, and thus sustain intense bombardment by radiation therefrom. In the same manner, power transmission fluids, heat transfer fluids, lubricants for control rod drive motors and linkages integrally associated with the reactor core, all disposed within or in close proximity to the reactor core, and lubricants for bearings and moving parts of somewhat more remote entities of nuclear power production plants, are similarly subjected, to greater or lesser degrees, to irradiation by the reactor.

However, it has become apparent that, as a general rule, nuclear reactor irradiation deleteriously reduces the fluidity of organic compounds, often to the extent of complete solidification in a very short time. This is notable in the case of liquid hydrocarbons and hydrocarbon esters, which include, to a large measure, the wide variety of liquids normally adapted to serve as efficacious lubricants and other such functional liquids in non-radioactive environments. For example, a representative, conventional, commercial, petroleum, hydrocarbon, lubricating oil—i.e., paraffinic, solvent-refined, Western (United States) automotive oil SAE–30—upon irradiation for four weeks in a reactor much the same as that outlined as a typical reactor hereinabove, thickened from its original viscosity range of medium-weight automotive oil to virtually a solid. In that instance the approximated cumulative radiation dosage sustained amounted to ca. $1.7 \times 10^{18}$ neutrons per square centimeter and a proportionate dosage of gamma radiation; significantly, this represents approximately the same accumulated radiation dosage, and thus expectably much the same radiation damage to the lubricant, that would be sustained in a typical design of aircraft-propulsion reactor, operating at a radiation flux intensity level about 2 orders of magnitude greater, in so short a time as only 6 to 7 hours. (For matter of definition, the approximated quantitative value of cumulative neutron dosage, as set forth immediately above and at other points hereinafter throughout the specification, refers to the computed product of the measured neutron flux into which the sample is inserted in units of neutrons/square centimeter/second and the measured duration of time, in units of seconds, throughout which the sample remained so inserted. Although it is true that the very presence in the neutron flux of the sample itself, which is not totally transparent to neutrons but effects some absorption thereof, results in the total flux at the location of the sample being lower in the presence than in the absence of the sample, nevertheless with the small volumes of samples employed and the very low neutron absorptivity of carbon, hydrogen, and oxygen atoms, as well as of the aluminum and quartz containers employed, in the present case, the computed product approaches quite closely the actual dosage sustained by any given square centimeter area within the sample.) Moreover, upon a somewhat longer irradiation, of five weeks (cumulative dosage $=1.94 \times 10^{18}$ neutrons per square centimeter), the same SAE–30 oil became altogether solid. Similarly, another hydrocarbon oil, of viscosity of a light automotive oil—i.e., a technical mixture of alkylbenzenes of molecular weight approximating 350, derived as by-product, high-molecular-weight bottoms in detergent alkylbenzene manufacture—when subjected to such a ca. 4 week irradiation, thickened to the range of a very heavy steam cylinder and valve stock. Likewise, in the case of organic esters, it was found that a representative ester—viz., di(2-ethyl hexyl) sebacate—thickened from the range of textile spindle, and light turbine, oil to a solid. Furthermore, even in the case of saturated polyethers—which the instant applicants have contemporaneously discovered to exhibit remarkably superior characteristics of irradiation-thickening resistance, and to which their companion patent application S.N. 380,145, filed September 8, 1953, now abandoned, for Method of Resisting Irradiation Induced Viscosity Increase of Organic Fluids, has been directed—some thickening, although considerably less pronounced, is sustained upon irradiation; for example, a representative polyether—viz., polymerized propene-oxide—upon a similar 4-week irradiation, thickened from the range of machine, and air-compressor, oil to that of heavy-grade, summer-weight automotive and railway car oil.

Furthermore, this difficulty was found to compound itself in cases where conventional additive agents were incorporated in these base oils. For instance, the organic amines are known in the art to constitute a particularly-effective type of conventional additive to improve the properties—especially thermal oxidation resistance—of lubricaing oils. Phenyl-α-naphthylamine, N-phenyl-4-hydroxyphenylamine, and N,N'-diphenyl-p-phenylenediamine are representative species employed in practice. However, when utilized under the subject reactor irradiation, the incorporation of these amines proved, quite adversely, to accelerate and increase radically the resultant viscosity increase upon irradiation. For example, when conventional amounts—1% to 2% by volume—of each of these amine species were separately incorporated in the polymerized propene-oxide base oil, of viscosity originally approximating light automotive oil, the resulting oils were found to thicken so rapidly as to the consistency of steam cylinder and valve oil upon only 2 weeks' irradiation, and to complete solidification upon 4 weeks' irradiation.

Such inordinate thickening under reactor irradiation has imposed a serious obstacle to the successful design of nuclear power plants. Under the circumstances, this effect tends to necessitate resort to constant disposal and replacement of thickened radiation-exposed fluids with a continual supply of fresh fluids so as to sustain the functions of the fluids. That such procedure in any event represents costly extravagance is obvious, and in cases of mobile nuclear power plants for the propulsion of aircraft, the ponderousness and bulk of the quantities of such expendable fresh fluids needed for the desired long-range operations, and of extra radiation shielding to protect the same from progressive radiation damage even before used, would seriously detract from the general performance, and indeed would ofttimes be practically preclusive even of take-off, of the resultingly overburdened aircraft. Consequently, there has been an increasing desire that new, effective means be found toward mitigating and overcoming this radiation-thickening difficulty, and thus affording more practical application of such organic liquids for functional purposes where exposed to the irradiation of operating neutronic reactors.

Accordingly, one object of the present invention is to provide a new and improved method for inhibiting neutronic-reactor-irradiation-induced viscosity increase in fluid organic hydrocarbons, hydrocarbon esters, and saturated poly-ethers.

Another object is to provide such a method which is simply effectible by means of incorporation of an additive agent in the organic fluid.

A further object is to provide such a method for affording full effectiveness upon the use of merely a quite minor proportion of the additive agent, and which otherwise does not materially alter the functional efficacy of the organic fluid treated.

Still another object is to provide such a method especially applicable where the organic fluid is specifically a lubricating oil.

Still a further object is to provide a new and improved method for the lubrication of a system with a lubricant being subjected therein to neutronic reactor irradiation deleterious to its lubricating efficacy.

Additional objects will become apparent hereinafter.

In accordance with the present invention, neutronic-reactor-irradiation-induced viscosity increase in an organic fluid, particularly one selected from the group which consists of hydrocarbons, hydrocarbon esters, and saturated poly-ethers, is inhibited by a method which comprises including in said fluid an agent selected from the group consisting of sulfur and organic sulfur compounds. Applicants have discovered that upon incorporating a minor volumetric proportion—ordinarily as little as only a few percent—of sulfur or an organic sulfur compound in a fluid organic hydrocarbon, hydrocarbon ester, or saturated poly-ether, the degree of radiation-induced viscosity increase resulting from exposure of a given dosage of neutronic reactor radiation is markedly reduced, the rate of progressive thickening under a given intensity of continuous reactor irradiation is substantially decreased and inhibited, and otherwise a pronounced relative resistance to reactor-irradiation damage is imparted to the fluid. For example, it was found that when only 2% of a preferred species of organic sulfur compound, dihexacosyl polysulfide, was incorporated in a fresh quantity of the technical alkylbenzene mixture alluded to hereinabove, and the same was subjected to much the same intensity and duration of neutronic reactor irradiation as was mentioned before, the so-inhibited hydrocarbon oil thickened of the order of 30% less—merely to the range of light steam cylinder oil. Similarly, the sebacate ester, with 10% phenyl dibutyl dithiophosphate incorporated therein, thickened only to the range of heavy-grade summer-weight automotive oil, rather than solidifying; likewise, the polymerized propene-oxide, with 2% hexadecanethiol incorporated, thickened, under 4 weeks' irradiation, merely to the range of medium weight automotive oil. Moreover, the presence of such a modicum of added sulfur or organic sulfur compounds does not detract materially from the lubricating efficacy of these oils when added thereto, such that application of such sulfur-agent-inhibited hydrocarbon, hydrocarbon ester and saturated poly-ether lubricants comprises, in accordance with the present invention, an improved method for the lubrication of a system with a lubricant being subjected therein to deleterious reactor irradiation. Being of such efficacy, and having such beneficial attributes, the present method clearly affords substantial practical advantages in the applications of functional fluids in nuclear power plants.

Considering the operation of the instant process more particularly, while the particular species of organic sulfur compounds, in addition to sulfur, suitable for such inhibition service are, in accordance with the present invention, subject to wide variation, the preferred agents are thioacid salts, thiophosphates, polysulfides, thiazoles, thiols, and thiocarbamates. Representative of these classes of organic sulfur compounds, and particularly preferred because of their eminent inhibition efficacy and appropriate solubility in hydrocarbon, ester, and poly-ether systems normally encountered, are:

Zinc dibutyl dithiocarbamate,
Phenyl dibutyl dithiophosphate,
Dihexacosyl polysulfide,
Mercaptobenzothiazole, and
Hexadecanethiol, as well as elemental sulfur itself.

The types of organic hydrocarbons, hydrocarbon esters, and saturated poly-ethers, encountered in practice, to which such sulfur and organic sulfur compound inhibitors are to be added in accordance with the present invention, are similarly subject to considerable variation.

Among hydrocarbons, the most common are simply petroleum cuts of suitable viscosity ranges for the desired services. Representative of the better of these are the commercial paraffinic solvent-refined lubricating oils derived from Western (United States) petroleum, and also from Pennsylvania, Middle East, Mid-Continent (United States), and Coastal (United States) petroleum crudes, of the various common viscosities ranging from light turbine oil, on including automotive oil, and on through heavy steam cylinder, gear, and chain oils. Too, fluid hydrocarbons derived from sources other than petroleum and having beneficial viscosities within much the same ranges are also frequently encountered, as exemplified by technical mixtures of alkylbenzenes of molecular weights approximating the order of 250 to 350, derived as by-product high-molecular-weight bottoms in detergent alkylbenzene manufacture. Also practically applicable are various liquid individual organic hydrocarbon compounds, especially long-chain paraffins and long-chain-paraffin-substituted aromatics, typified by octadecylbenzene:

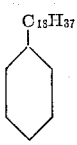

which approximates the viscosity of textile spindle oil. Among the esters, different species affording appropriate viscosity, heat resistance qualities, and the like, and thus adapted to functional service, are likewise varied. Prominent, though, are those derived from dicarboxylic acids both aromatic and aliphatic, in conjunction with aliphatic, or, better, straight-chain saturated aliphatic, alcohols, and especially from those acids and alcohols of such types respectively comprising from about six to twelve carbon atoms in their molecules. Such compounds provide a liberal assortment of different viscosities and other functional properties; representative of these are:

Di(2-ethyl hexyl)sebacate i.e.,

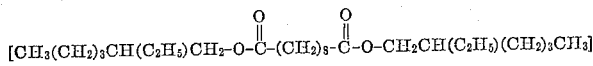

approximating the consistency of light turbine oil and instrument oil; didecyl terephthalate i.e.,

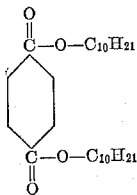

approximating the consistency of automotive oil; and di(2-ethyl hexyl) orthophthalate i.e.,

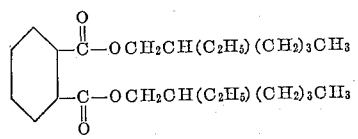

di(2-ethyl hexyl) adipate i.e.,

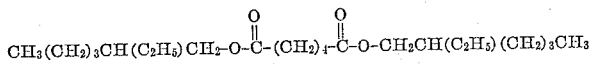

and diethyl adipate i.e.,

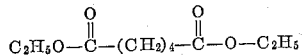

which approximate the consistency of light textile spindle, and very light instrument, oils. Saturated poly-ethers appropriate for present service as superior radiation-thickening-resistant fluids, in accordance with applicants' companion patent application S.N. 380,145, now abandoned, should contain at least two ether linkages in their molecules, and are preferred to be constituted of a multiplicity of ether linkages spaced between short, saturated, and preferably straight-chain aliphatic radicals. Furthermore the poly-ether should, of course, have a viscosity appropriate for the particular service to which it is to be applied. For services calling for quite low viscosities, such as lubrication of instruments, individual poly-ether compounds of definite composition are available and readily applicable; representative of these is the dimethyl ether of tetraethylene glycol:

$(CH_3OC_2H_4OC_2H_4OC_2H_4OC_2H_4OCH_3)$ which approximates the viscosity of light instrument oil. For services requiring higher viscosities, where individual compounds of uniform definite molecular constitution become more complex and unwieldy, both in molecular structure and in preparation, polymerized alkene-oxides have proven to be eminently suited, especially polymerized propene-oxide. Such alkene oxides may be polymerized by various methods known in the art; one of the most common and well developed method comprises the reaction of an alkene oxide, such as 1,2-propene oxide, with an aliphatic monohydric alcohol, wherein the alkene-oxide molecules undergo conversion to the corresponding oxyalkene radicals, which are thereupon regarded to link end-to-end to form long polymeric molecules, which molecules are ultimately terminated at one extremity by the aliphatic radical of the alcohol employed, and at the other extremity by a hydroxyl group. In some instances the art has found it preferable to resort to an ester, rather than an alcohol, as the agent for promoting polymerization. The reaction products are fundamentally mixtures of poly-ether molecules of different sizes, and are available in the art in different degrees of polymerization, largely ranging from fluids having an average molecular weight of 400 to fluids having an average molecular weight as high as 3,000, with corresponding viscosities ranging from those of light instrument, textile spindle, and turbine oils, on up through the automotive oil range, to virtual solids. In the case of propene oxide, the polymer has the fundamental structure:

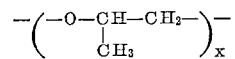

The presence of other additives incorporated in the hydrocarbon, ester, and poly-ether base oils, unless they adversely engage in interaction with the sulfur or organic sulfur compounds employed, are normally unobjectionable; these, added to enhance the oils in their own various specific manners, consequently tend to complement the added sulfur-agent in enhancing the overall efficacy of the resulting compounded oil. For example, it is often desirable to incorporate—in accordance with another contemporaneous invention of the present applicants, to which their companion application S.N. 380,144, filed September 8, 1953, for Method of Inhibiting Radiation Damage to Organic Fluids, is directed—a small amount of an organic selenide, toward substantially inhibiting the reactor-irradiation-induced viscosity increase and thus complementing the action of the instant sulfur or organic sulfur compounds; this is particularly applicable in the cases of hydrocarbons and esters, as well as in the case of the tetraglycol, and the like. Also, especially in the presence of base metals, e.g., iron and copper, say those constituting the container, mechanical members, bearings, and the like, in contact with the oil, the addition of small amounts of alizarin or other hydroxyl-substituted anthraquinone, for example quinizarin, may likewise be desirable toward inhibiting adverse thickening of the oil upon irradiation.

Considering the effect of the presence of base metals in contact with the base oil upon the degree of radiation-induced viscosity increase sustained, this has been especially noted, particularly in the case of the poly-ethers, to generally intensify such thickening. For this particular problem, applicants have further found not only that the incorporation of sulfur and organic sulfur compounds generally affords some improvement, but moreover that those organic sulfur compounds having both a nitrogen linkage and a sulfur linkage attached to the same carbon atom, appear to be specifically effective, even in so small amount as 1% of the initial volume of the poly-ether base oil, in inhibiting such base-metal-intensified thickening susceptibility, in further accordance with the present invention. Mercaptobenzothiazole and zinc dibutyl dithiocarbamate exemplify the preferred species of this special class.

In conducting the present method, the sulfur-agent is simply added to, intimately admixed with, and dissolved into, the liquid hydrocarbon, ester, or poly-ether; thereupon, the resulting system, in its consequent state of markedly enhanced reactor-irradiation-thickening resistance, is applied to serve in lubrication, or other desired function, under subjection to deleterious irradiation. With respect to the amount of sulfur agent to be added, it may initially be said that any amount, however small, should have some beneficial radiation-damage-inhibition effect. Furthermore, based upon empirical investigation, it appears that the extent of inhibition qualitatively increases directly with the amount of sulfur-agent incorporated; incorporation of sulfur-agent in the amount of 1 volumetric percent of the quantity of original base oil was found to produce discernable inhibition, while upon addition of 2%, the inhibition became substantially pronounced, and at 10% much more pronounced. Superimposed upon this desirability of increasing the proportion of sulfur agent incorporated is the consideration that undue excesses of the additive should best be avoided toward minimizing the extent of alteration of composition of the original fluid and concomitantly its functional properties. Accordingly, in practice, 1 to 10 volumetric percent represents the preferred range for the amount of added inhibitor, and, in the main, 2% appears to be the practical and economic optimum, with the use of more being restricted to the occasional, more-intractable cases of irradiation damage.

Further illustration of the quantitative aspects and preferred conditions and procedures of the present method is provided in the following specific example.

EXAMPLE

A series of samples of liquid hydrocarbons, hydrocarbon esters, and saturated poly-ethers of different exemplary types, and of different viscosities representative of ranges generally useful for applications in nuclear power plants, were assembled. The samples of each species of fluid were divided into a number of smaller quantities, into some of which were incorporated amounts of sulfur or one of a number of different, preferred, representative organic sulfur compounds, as indicated, in appropriate proportions in accordance with the present invention, while other portions were retained free of sulfur-agent for purpose of comparison. Into some were incorporated minor proportions of other additive agents, as further indicated, also. The quantities so prepared were divided into still smaller portions. One portion of each was retained in original condition for viscosity measurement. Other of the portions so obtained were introduced, in substantially identical quantity (ca. 7 milliliters) into respective small transparent fused quartz ampoules, of ca. 14 to 17 milliliters internal volume, having a wall thickness of approximately one millimeter, and provided in the top with a ca. 5 millimeters diameter vent hole. Each ampoule was disposed in a vertical right cylindrical 2S aluminum can, 0.75 inch internal diameter x 2.875 inches internal height, of 0.035 inch wall thickness, completely closed except for a number 50 drill hole in its top. The ampoule-containing cans were thereupon inserted and disposed directly within the core of an operating thermal neutronic reactor similar to that alluded to as a typical reactor in connection with Table I supra, in positions wherein the radiation flux intensity approximated $0.5 \times 10^{12}$ to $1 \times 10^{12}$ neutrons per square centimeter per second, and $2 \times 10^5$ to $5 \times 10^5$ roentgens/hr. in gamma radiation; the drill holes in the tops of the cans were exposed in direct communication with the streams of air being drawn through the reactor as coolant. The samples were maintained within the operating reactor for differing periods of duration ranging mostly from 1 to 4 weeks, and, throughout the irradiation, different groups of samples were retained at different temperature levels representative of those to which the samples would be subjected in functional applications. Upon removal from the reactor, the viscosity of each of the portions was determined both at a 100° F. and at 210° F.; similar viscosity measurements were made upon retained portions of the samples in original, unirradiated state. The data obtained, including neutron dosage sustained by each portion at its particular location within the reactor, as a convenient indication of the extent total dosage of all species of radiation sustained, are presented in comparative fashion in Table II below.

*Table II*

EFFECT OF NEUTRONIC REACTOR IRRADIATION UPON VISCOSITY OF ORGANIC FLUIDS

| Identity—Additive | $\theta_1$[a] (Weeks) | $\theta_2$[b] (Hrs.) | Neutron Dosage[c] $\times 10^{18}$ (n./cm.²) | Temp. (ave.) (° C.) | Viscosity (centistokes) | | | |
|---|---|---|---|---|---|---|---|---|
| | | | | | At 100° F. | | At 210° F. | |
| | | | | | Orig. | Irrad. | Orig. | Irrad. |
| Typical Damage to Lubricating Oil: Paraffinic Solvent-Refined Western (U.S.) Lubricating Oil (SAE-30) | 1 | ½ | 0.15 | 46 | 118 | 160 | 11.5 | 13.8 |
| | 1 | 2 | 0.45 | 20 | 118 | 220 | 11.3 | 17.4 |
| | 1 | 2 | 0.44 | 80 | 117 | 251 | 11.4 | 19.1 |
| | 2 | 2½ | 0.59 | 73 | 117 | 477 | 11.4 | 29.2 |
| | 4 | 3 | 0.76 | 46 | 118 | broken | 11.3 | broken |
| | 2 | 4 | 0.94 | 78 | 124 | 1312 | 11.5 | 48.4 |
| | 2 | 4 | 0.94 | 78 | 124 | 1300 | 11.7 | 43.0 |
| | 4 | 4½ | 1.14 | 80 | 117 | 13.55 | 11.4 | 60.0 |
| | 4 | 7 | 1.70 | 20 | 118 | too viscous | 11.3 | too viscous |
| | 5 | 8 | 1.94 | 67 | 117 | solid | 11.4 | solid |
| Esters: Di(2-ethyl hexyl) sebacate | 1 | 1½ | 0.33 | 66 | 12.9 | 25.8 | 3.4 | 5.4 |
| | 1 | 1½ | 0.40 | 66 | 13.1 | 31.4 | 3.4 | 6.1 |
| | 2 | 3½ | 0.84 | 66 | 12.8 | 132.8 | 3.4 | 17.6 |
| | 2 | 3½ | 0.84 | 67 | 12.8 | 237.8 | 3.4 | 22.6 |
| | 4 | 5½ | 1.35 | 65 | 12.9 | 438 | 3.4 | 46.0 |
| | 4 | 6 | 1.53 | 66 | 13.1 | solid | 3.4 | solid |
| Di(2-ethyl hexyl) sebacate +1% Zinc Dibutyl Dithiocarbamate | 1 | 1½ | 0.41 | 69 | 13.5 | 26.4 | 3.6 | 5.5 |
| | 4 | 6½ | 1.58 | 69 | 13.5 | solid | 3.6 | solid |
| Di(2-ethyl hexyl) sebacate +2% Phenyl dibutyl dithiophosphate | 4 | 6 | 1.56 | 68 | 13.5 | solid | 3.5 | solid |
| Di(2-ethyl hexyl) sebacate +10% Phenyl dibutyl dithiophosphate | 1 | 1½ | 0.34 | 65 | 15.5 | 22.2 | 3.9 | 4.7 |
| | 4 | 6½ | 1.63 | 77 | 15.5 | 211 | 3.9 | 33.4 |

EFFECT OF NEUTRONIC REACTOR IRRADIATION UPON VISCOSITY OF ORGANIC FLUIDS

| Identity—Additive | $\theta_1$[a] (Weeks) | $\theta_2$[b] (Hrs.) | Neutron Dosage[c] $\times 10^{18}$ (n./cm.$^2$) | Temp. (ave.) (° C.) | Viscosity (centistokes) At 100° F. Orig. | Viscosity At 100° F. Irrad. | At 210° F. Orig. | At 210° F. Irrad. |
|---|---|---|---|---|---|---|---|---|
| Di(2-ethyl hexyl) sebacate +2% Dihexacosyl polysulfide | 1 | 1½ | 0.41 | 69 | 14.4 | 28.9 | 3.7 | 5.8 |
|  | 4 | 6½ | 1.58 | 69 | 14.4 | solid | 3.7 | solid |
| Di(2-ethyl hexyl) sebacate | d 1 | 2 | 0.46 | 70 | 13.1 | 34.7 | 3.5 | 6.6 |
|  | d 4 | 7 | 1.80 | 70 | 13.1 | solid | 3.4 | solid |
| Di(2-ethyl hexyl) sebacate +10% Phenyl dibutyl dithiophosphate | d 1 | 1½ | 0.37 | 69 | 15.5 | 21.6 | 3.8 | 4.7 |
|  | d 4 | 6½ | 1.61 | 76 | 15.5 | 162 | 3.8 | 18.4 |
| Di(2-ethyl hexyl) sebacate +Sat'd. with Alizarin +10% Phenyl dibutyl dithiophosphate | d 1 | 1½ | 0.36 | 66 | 15.7 | 22.2 | 3.9 | 4.7 |
|  | d 4 | 6 | 1.48 | 130 | 15.7 | 304 | 3.9 | 30.4 |
| Poly Ethers: |  |  |  |  |  |  |  |  |
| Poly (propene oxide) | 1 | ¼ | 0.13 | 42 | 57.3 | 80.4 | 9.4 | 11.7 |
|  | 1 | 1½ | 0.36 | 73 | 57.3 | 99.2 | 9.6 | 13.0 |
|  | 1 | 1½ | 0.37 | 73 | 57.3 | 95.0 | 9.6 | 12.7 |
|  | 1 | 1½ | 0.37 | 73 | 57.3 | 99.5 | 9.6 | 13.1 |
|  | 4 | 1½ | 0.41 | 42 | 57.3 | 114.0 | 9.5 | 13.8 |
|  | 1 | 2 | 0.45 | 20 | 57.3 | 139.0 | 9.5 | 16.6 |
|  | 1 | 2 | 0.46 | 134 | 57.3 | 64.8 | 9.6 | 9.2 |
|  | 2 | 4 | 0.94 | 134 | 57.3 | 72.0 | 9.6 | 9.2 |
|  | 3 | 5½ | 1.40 | 134 | 57.3 | 139.0 | 9.6 | 13.5 |
|  | 4 | 6½ | 1.60 | 73 | 57.3 | 196 | 9.6 | 22.5 |
|  | 4 | 6½ | 1.60 | 74 | 57.3 | 232 | 9.6 | 18.7 |
|  | 4 | 6½ | 1.60 | 73 | 57.3 | 438 | 9.6 | 30.1 |
|  | 4 | 7 | 1.70 | 20 | 57.3 | 435 | 9.6 | 27.5 |
|  | 4 | 7 | 1.80 | 134 | 57.3 | 188.0 | 9.6 | 15.3 |
|  | 5 | 8½ | 2.10 | 131 | 57.3 | 334 | 9.6 | 21.3 |
|  | 6 | 10 | 2.50 | 131 | 57.3 | 1215 | 9.6 | 49.9 |
|  | 26 | 33½ | 8.39 | 136 | 57.3 | solid | 9.6 | solid |
| Poly (propene oxide) +2% Phenyl dibutyl dithiophosphate | 1 | 1½ | 0.37 | 74 | 58.0 | 69.9 | 9.7 | 9.8 |
|  | 4 | 6½ | 1.60 | 74 | 58.0 | 118 | 9.7 | 12.9 |
| Poly (propene oxide) +2% Mercaptobenzothiazole | 1 | 1½ | 0.37 | 74 | 60.0 | 76.6 | 9.8 | 10.5 |
|  | 4 | 6½ | 1.60 | 75 | 60.0 | 153.0 | 9.8 | 14.8 |
|  | 26 | 33 | 8.22 | 134 | 60.0 | solid | 9.8 | solid |
| Poly (propene oxide) +2% Hexadecanethiol | 1 | 1½ | 0.43 | 63 | 52.6 | 67.4 | 9.1 | 9.7 |
|  | 4 | 7 | 1.70 | 63 | 52.6 | 141.0 | 9.1 | 13.7 |
| Poly (propene oxide) | d 2 | 2 | 0.55 | 66 | 57.3 | 177 | 9.6 | 18.0 |
|  | d 5 | 7 | 1.81 | 61 | 57.3 | 538 | 9.6 | 32.9 |
| Poly (propene oxide) +2% Phenyl dibutyl dithiophosphate | d 1 | 1½ | 0.35 | 69 | 57.1 | 71.8 | 9.5 | 10.5 |
|  | d 1 | 1½ | 0.36 | 71 | 57.8 | 75.2 | 9.7 | 10.8 |
|  | d 4 | 6 | 1.50 | 69 | 57.8 | 133.0 | 9.7 | 13.5 |
|  | d 4 | 6 | 1.50 | 66 | 57.1 | 156.0 | 9.5 | 14.6 |
| Poly (propene oxide) +1% Zinc dibutyl dithiocarbamate | d 1 | 2 | 0.46 | 68 | 56.4 | 108.0 | 9.8 | 14.7 |
|  | d 4 | 7 | 1.80 | 68 | 56.4 | 242 | 9.8 | 20.3 |
| Poly (propene oxide) +1% Mercaptobenzothiazole | d 1 | 2 | 0.46 | 68 | 58.0 | 82.2 | 9.7 | 11.2 |
|  | d 4 | 7 | 1.80 | 68 | 58.0 | 158 | 9.9 | 15.4 |
| Poly (propene oxide) + Sat'd. with Alizarin | d 1 | 2 | 0.46 | 69 | 58.4 | 131.0 | 9.8 | 16.7 |
|  | d 4 | 7 | 1.80 | 69 | 58.4 | 1098 | 9.8 | 65.5 |
| Poly (propene oxide) + Sat'd. with Alizarin +2% Phenyl dibutyl dithiophosphate | d 1 | 1½ | 0.35 | 69 | 57.8 | 70.2 | 9.8 | 10.3 |
|  | d 4 | 6 | 1.50 | 67 | 59.7 | 130.0 | 9.8 | 13.4 |
| Poly (propene oxide) + Sat'd. with Alizarin +2% Mercaptobenzothiazole | d 1 | 1½ | 0.36 | 70 | 61.9 | 77.2 | 10.0 | 10.9 |
|  | d 4 | 6 | 1.50 | 68 | 61.9 | 153.0 | 10.0 | 15.0 |
| Poly (propene oxide) [Higher Polymer] | 1 | 1½ | 0.41 | 70 | 84.0 | 174.0 | 13.9 | 20.0 |
|  | 4 | 6½ | 1.60 | 70 | 84.0 | 315 | 14.0 | 23.0 |
| Poly (propene oxide) [Higher Polymer] +2% Phenyl dibutyl dithiophosphate | 1 | 1½ | 0.42 | 73 | 91.3 | 97.6 | 13.9 | 12.7 |
|  | 4 | 6½ | 1.63 | 73 | 91.3 | 248 | 13.9 | 19.7 |
| Poly (propene oxide) [Higher Polymer] +1% Zinc dibutyl dithiocarbamate | 1 | 1½ | 0.41 | 71 | 89.8 | 155.0 | 14.1 | 19.0 |
|  | 4 | 6½ | 1.60 | 71 | 89.8 | 265 | 14.1 | 22.2 |
| Hydrocarbons: |  |  |  |  |  |  |  |  |
| Alkylbenzene (M.W.=250)[e] | 1 | 1½ | 0.35 | 66 | 6.3 | 8.3 | 1.7 | 2.1 |
|  | 1 | 1½ | 0.38 | 77 | 6.1 | 8.0 | 1.7 | 2.0 |
|  | 1 | 1½ | 0.41 | 60 | 6.1 | 9.1 | 1.7 | 2.1 |
|  | 4 | 5½ | 1.36 | 66 | 6.3 | 21.3 | 1.7 | 3.4 |
|  | 4 | 6½ | 1.60 | 60 | 6.1 | 25.9 | 1.7 | 3.9 |
|  | 4 | 7 | 1.70 | 78 | 6.1 | 27.2 | 1.7 | 4.0 |
|  | 4 | 7 | 1.80 | 140 | 6.3 | 34.5 | 1.7 | 4.7 |
|  | 4 | 7 | 1.73 | 180 | 6.4 | 92.0 | 1.8 | 7.7 |
|  | 4 | 7 | 1.79 | 220 | 6.4 | Empty | 1.8 | Empty |
| Alkylbenzene (M.W.=250)[e] +0.8% Sulfur | 1 | 1½ | 0.43 | 64 | 6.4 | 8.7 | 1.8 | 2.1 |
|  | 4 | 7 | 1.70 | 64 | 6.4 | 22.2 | 1.8 | 3.7 |
| Octadecylbenzene | d 1 | 1½ | 0.39 | 76 | 11.0 | 15.5 | 2.8 | 3.6 |
|  | d 4 | 6 | 1.46 | 129 | 11.0 | 127 | 2.8 | 11.8 |
| Octadecylbenzene +5% Didodecyl selenide | d 1 | 1½ | 0.38 | 74 | 10.6 | 14.2 | 2.8 | 3.4 |
|  | d 4 | 5½ | 1.39 | 75 | 10.6 | 44.0 | 2.8 | 7.4 |
| Octadecylbenzene +5% Didodecyl selenide +2.5% Mercaptobenzothiazole | d 1 | 1½ | 0.39 | 74 | 11.0 | 14.9 | 2.8 | 3.4 |
|  | d 4 | 6 | 1.50 | 130 | 11.0 | 40.5 | 2.8 | 7.0 |
| Alkylbenzene (M.W.=350)[f] | 1 | 1½ | 0.37 | 63 | 84.0 | 122.0 | 6.7 | 8.3 |
|  | 4 | 6 | 1.44 | 63 | 84.0 | 700 | 6.7 | 22.6 |
| Alkylbenzene (M.W.=350)[f] +1% Zinc dibutyl dithiocarbamate | 1 | 1½ | 0.39 | 66 | 85.8 | 116.0 | 6.7 | 8.1 |
|  | 4 | 6 | 1.51 | 66 | 85.8 | 530 | 6.7 | 19.2 |
| Alkylbenzene (M.W.=350)[f] +2% Phenyldibutyl dithiophosphate | 1 | 1½ | 0.38 | 65 | 84.0 | 123.0 | 6.7 | 8.4 |
|  | 4 | 6 | 1.49 | 65 | 84.0 | 595 | 6.7 | 20.4 |
| Alkylbenzene (M.W.=350)[f] +2% Dihexacosyl polysulfide | 1 | 1½ | 0.39 | 66 | 87 | 119 | 7.1 | 8.4 |
|  | 4 | 6 | 1.51 | 66 | 87.4 | 490 | 7.1 | 19.2 |
| Solvent Refined Western U.S. Paraffinic Lubricating Oil (SAE-30) | 2 | 4 | 0.94 | 78 | 124 | 1312 | 11.5 | 48.0 |
|  | 2 | 4 | 0.94 | 78 | 124 | 1300 | 11.7 | 43.4 |
| Solvent Refined Western U.S. Paraffinic Lubricating Oil (SAE-30) +1% Calcium Sulfonate of Naphthenic Highly-Refined Western (U.S.) White Oil | 2 | 3½ | 0.87 | 70 | 128 | 1170 | 11.8 | 42.2 |
|  | 2 | 3½ | 0.87 | 70 | 128 | 1340 | 12.0 | 52.0 |

[a] Actual time irradiated.
[b] Approximated duration for same dosage if disposed in a reactor suitable for aircraft propulsion, having radiation flux densities of about two orders of mangitude greater—e.g., ca. $7 \times 10^{13}$ neutrons/cm.$^2$/sec.
[c] Approximated total cumulative neutron dosage sustained.
[d] Plus iron and copper wires to simulate exposure to metals of construction.
[e] By-product high-molecular-weight bottoms from commercial detergent alkyl-benzene manufacture; technical mixture of straight-, and branched-chain-, aliphatic substituted benzenes of average molecular weight approximating 250.
[f] By-product high-molecular-weight bottoms from commercial detergent alkyl-benzene manufacture: technical mixture of straight-, and branched-chain-, aliphatic substituted benzenes of average molecular weight approximating 350.

The results presented in Table II clearly demonstrate the definite inhibition of irradiation damage afforded in each case by the incorporation of only a few percent of sulfur or organic sulfur compounds. Further indicated is the practical efficacy of 2% by volume (per initial volume of the original base oil) of the sulfur agent in the cases of the polyethers and hydrocarbons, although the effectiveness of so little as 0.8% to 1% does not fall far behind. In a more intractable case of the sebacate ester, it may be seen that it took so much as 10% of the sulfur agent to finally overcome the solidification upon the 4 week irradiation; however, that positive improvement was nevertheless being afforded by the smaller percentages is shown by the 1 week irradiation results in that case. Also apparent is the definite and substantial inhibition, of base-metal-intensified irradiation-thickening susceptibility in the case of the saturated poly-ether, by the organic sulfur compounds having both a sulfur linkage and a nitrogen linkage attached to the same carbon atom, particularly the dithiocarbamate and the thiazole, as well as further indication of like eminent effectiveness by other organic sulfur compounds by the results demonstrated in the case of the dithiophosphate. In the case of the calcium sulfonate of the petroleum oil, it is to be noted that the agent had a very low specific sulfur content, and, moreover, was employed in only low volumetric proportion.

Although this invention has been described with particular emphasis upon the currently important application to fluid organic hydrocarbons, esters, and poly-ethers, involved in nuclear power plant services, it is inherently of much wider applicability. In pursuits other than power generation, where such organic fluids are unprotectedly disposed in the proximity of neutronic reactors, the instant invention may likewise afford beneficial results. Moreover, aside from neutronic reactors, this procedure may be applied to inhibit damage from the same types of deleterious radiation, especially neutrons and gamma rays, emitted from other conventional radiation sources of same, such as radium-beryllium neutrons sources, and nuclear reactions effected by means of Van de Graaff-generator-energized linear accelerators, and cyclotrons, and the like. Various additional applications of the hereinbefore-disclosed method will become apparent to those skilled in the art. It is therefore to be understood that all matters contained in the above description and example are illustrative only and do not limit the scope of the present invention.

Cross-reference is made to companion co-pending applications of the common-assignee, directed to methods for similarly inhibiting and avoiding such reactor-irradiation damage to organic fluids, through employment of different agents:

S.N. 380,144, in the names of G. H. Denison, R. O. Bolt, and J. W. Kent and F. A. Christiansen, filed September 8, 1953, for Method of Inhibiting Irradiation-Induced Viscosity Increase of Organic Fluids;

S.N. 380,147, in the names of G. H. Denison, R. O. Bolt, J. W. Kent, F. A. Christiansen and J. C. Carroll, filed September 8, 1953, for Method of Inhibiting Irradiation-Induced Viscosity Increase of Organic Fluids;

S.N. 380,146, in the names of G. H. Denison, R. O. Bolt, J. W. Kent and F. A. Christiansen, filed September 8, 1953, now abandoned, for Method of Inhibiting Irradiation-Induced Viscosity Increase of Organic Fluids; and S.N. 380,145, in the names of G. H. Denison, R. O. Bolt, J. W. Kent and F. A. Christiansen, filed September 8, 1953, now abandoned, for Method of Resisting Irradiation-Induced Viscosity Increase of Organic Fluids.

What is claimed is:

1. In a method for lubricating a system with an organic oil of lubricating viscosity selected from the group consisting of hydrocarbons, alkyl esters derived from dicarboxylic acids and saturated aliphatic alcohols containing from 6 to 12 carbon atoms and poly (propene-oxide) having a viscosity of about 57.3 to 84 centistokes at 100° F., said system being subjected to nuclear irradiation, the improvement comprising lubricating said system with a mixture of said oil together with a small amount, sufficient to substantially protect said oil from deleterious irradiation effects, of an agent selected from the group of organic sulfur compounds consisting of phenyl dibutyl dithiophosphate, mercaptobenzothiazole, dihexacosyl polysulfide and hexadecanethiol.

2. The method of claim 1, wherein the amount of said agent is approximately 1%–10%, by volume.

3. The method of claim 1, wherein the organic sulfur compound is phenyl dibutyl dithiophosphate.

4. The method of claim 1, wherein the organic sulfur compound is mercaptobenzothiazole.

5. The method of claim 1, wherein the organic sulfur compound is dihexacosyl polysulfide.

6. The method of claim 1, wherein the organic sulfur compound is hexadecanethiol.

References Cited in the file of this patent

UNITED STATES PATENTS

| | | |
|---|---|---|
| 2,258,806 | Pier et al. | Oct. 14, 1941 |
| 2,346,155 | Denison et al. | Apr. 11, 1944 |
| 2,382,700 | Eby | Aug. 14, 1945 |
| 2,398,416 | Denison et al. | Apr. 16, 1946 |
| 2,543,735 | Stewart et al. | Feb. 27, 1951 |

OTHER REFERENCES

Daniels: U.S. Atomic Energy Commission, MMDC–893, page 6, date declassified, April 7, 1947.